(12) United States Patent  
Watanabe

(10) Patent No.: US 9,146,136 B2  
(45) Date of Patent: Sep. 29, 2015

(54) AXIS RUN-OUT MEASURING METHOD AND ANGLE DETECTING DEVICE WITH SELF-CALIBRATION FUNCTION HAVING AXIS RUN-OUT MEASURING FUNCTION

(75) Inventor: Tsukasa Watanabe, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 692 days.

(21) Appl. No.: 13/508,686

(22) PCT Filed: Oct. 27, 2010

(86) PCT No.: PCT/JP2010/069023  
§ 371 (c)(1),  
(2), (4) Date: Jun. 8, 2012

(87) PCT Pub. No.: WO2011/055662  
PCT Pub. Date: May 12, 2011

(65) Prior Publication Data  
US 2012/0283978 A1 Nov. 8, 2012

(30) Foreign Application Priority Data  
Nov. 9, 2009 (JP) ................................. 2009-255712

(51) Int. Cl.  
*G01R 33/10* (2006.01)  
*G01D 5/244* (2006.01)  
*G01D 5/347* (2006.01)

(52) U.S. Cl.  
CPC .......... *G01D 5/24476* (2013.01); *G01D 5/2448* (2013.01); *G01D 5/2449* (2013.01); *G01D 5/24452* (2013.01); *G01D 5/3473* (2013.01)

(58) Field of Classification Search  
CPC .......... G01D 5/24452; G01D 5/24476; G01D 5/2448; G01D 5/3473

USPC ........................................................... 702/94  
See application file for complete search history.

(56) References Cited

U.S. PATENT DOCUMENTS 7,143,518 B2 * 12/2006 Watanabe et al. ............. 33/1 PT  
2006/0043964 A1 3/2006 Watanabe et al.  
(Continued)

FOREIGN PATENT DOCUMENTS

CN 1311852 A 9/2001  
CN 101162346 A 4/2008  
(Continued)

OTHER PUBLICATIONS

International Search Report issued in PCT/JP2010/069023, mailed Dec. 14, 2010.

(Continued)

*Primary Examiner* — Andrew Schechter  
*Assistant Examiner* — Peter Ngo  
(74) *Attorney, Agent, or Firm* — Birch, Stewart, Kolasch & Birch, LLP

(57) ABSTRACT

An angle detecting device with self-calibration function, in which sensor heads are provided with an equiangular interval on a scale disc fixed to a rotating shaft, one sensor head is selected as reference, a sum of measurement differences between the reference and another sensor head is divided by the number of sensor heads, to determine an average, whereby a self-calibration value is obtained, in which a sensor head of the reference is changed to another in order, and the respective self-calibration value is obtained, which value is deviated by an angle of arrangement with respect to a particular sensor head, and a phase is aligned to a self-calibration value of the particular one as the reference, to determine an average for calculations of this phase conversion, which average is subtracted from the respective calculation subjected to the phase conversion, to obtain only asynchronous angular errors.

2 Claims, 6 Drawing Sheets

(56) References Cited

U.S. PATENT DOCUMENTS

| | | | |
|---|---|---|---|
| 2008/0084479 A1* | 4/2008 | Uenaka | 348/208.5 |
| 2010/0181468 A1* | 7/2010 | Nakamura et al. | 250/231.13 |

FOREIGN PATENT DOCUMENTS

| | | | |
|---|---|---|---|
| JP | 2972652 B2 | 11/1999 | |
| JP | 2006-98392 A | 4/2006 | |
| JP | 3826207 B2 | 9/2006 | |
| WO | WO 2007/086160 A1 | 8/2007 | |
| WO | WO 2007086160 A1 * | 8/2007 | 250/231.13 |

OTHER PUBLICATIONS

Chinese Office Action dated Apr. 1, 2014, issued in corresponding Chinese Patent Application No. 201080050388.6.

* cited by examiner

AXIS RUN-OUT MEASURING METHOD AND ANGLE DETECTING DEVICE WITH SELF-CALIBRATION FUNCTION HAVING AXIS RUN-OUT MEASURING FUNCTION

TECHNICAL FIELD

The present invention relates to an angle detecting device, such as a rotary encoder, for detecting a rotation angle, and specifically, the present invention relates to an axis run-out measuring method and an angle detecting device with a self-calibration function having an axis run-out measuring function, capable of detecting, for example, an axis run-out of a spindle of a processing machine, a rotating shaft run-out of an engine of an automobile and an aircraft, and an axis run-out of an axle of an automobile, by using said angle detecting device with a self-calibration function which is capable of determining a calibration value of a scale including an angular error generated by the influence of change of the angle detecting device with the aging variation or the like, an eccentricity of an attached shaft under the environment to be used included in angle information that is output from the angle detecting device, by having the self-calibration function.

BACKGROUND ART

In general, methods for measuring an axis run-out of a rotation axis are mainly methods using a contact method with an electric micrometer and a non-contact method with a capacitance sensor and a laser as shown in Patent Literature 1 below.

The contact method cannot be utilized with a high-speed rotation axis, and when the capacitance sensor in the non-contact method is used, it takes a lot of time to set up the measurement because the gap between a rotation axis to be measured and the sensor is narrow.

Further, since the laser-type is expensive, there is a problem in that the cost is high when two axes, i.e., X and Y, are provided.

Meanwhile, the general principle of an angle detecting device, such as a rotary encoder, is as follows. The angle detecting device is a device having scale marks written at a circumference of a circular scale disc, and a sensor head for counting a scale, to count the number of scale marks, thereby outputting angle information. Various kinds of devices are used as the angle detecting device. Since the angle detecting device has scale marks written artificially, the scale lines are not written equiangularly, thus the angle information obtained from the positions of the scale lines involves an error. In FIG. 1, a radial line L1 is an ideal scale line position (equiangular interval line), and a short radial broken line L2 is an actual scale line position. A graph in the right of FIG. 1 is obtained by plotting a difference from the ideal position.

The points in the drawing in the right in FIG. 1 are calibration values of scale lines of the angle detecting device. FIG. 1 shows 36 scale lines as depicted, but actually, the angle detecting device has several thousand to several hundred thousand scale lines. A method for calibrating these lines includes several methods for self-calibrating the lines, by comparing the scales of the two angle detecting device with each other. In this method, even if the two angle detecting devices are not calibrated, they can be calibrated at a time, and thus it is not necessary to prepare a more accurate angle detecting device at a higher level. It should be noted that the meaning of the self-calibration is that, even when two angle detecting devices of which angular errors are unknown are compared, the calibration values which are angular errors of both of the devices can be found at the same time.

In the national standard device of angle (angle measuring device), an angle detecting device residing inside of the angle measuring device and an angle detecting device to be calibrated that is provided thereabove, are calibrated using self-calibration method according to the equal-division-averaging method.

The equal-division-averaging method will be simplified and briefly explained with reference to FIG. 2. A difference (SA1) of a scale signal is measured between one of first sensor heads 12, 12 . . . arranged on a scale disc of a first angle detecting device 11 at a lower side and a second sensor head 14 arranged on a scale disc of a second angle detecting device 13 at an upper side. Then, a difference (SA2) is measured in the same manner between another adjacent sensor head 12 at the lower side and the second sensor head 14 at the upper side. Likewise, differences (SA1, SA2, SA3, SA4, SA5) are measured between other first sensor heads 12 and the second sensor head 14, and an average value SAV of those differences is determined, so that a calibration curve of the second angle detecting device 13 at the upper side can be obtained.

When an angular error that is output from the first angle detecting device 11 at the lower side is denoted as $a_i$, and an angular error that is output from the second angle detecting device 13 at the upper side is denoted as $b_i$, the difference is $SAj = b_i - a_{i+(j-1)N/M}$ and, and the average value SAV is as follows.

$$SAV_i = \frac{1}{M}\sum_{j=1}^{M} SAj_i \qquad (1)$$

$$= b_i - \frac{1}{M}(a_i + a_{i+N/M} + \ldots + a_{i+(j-1)N/M} + \ldots + a_{i+(M-1)N/M})$$

Herein, i=1, 2, 3 . . . , N is the number of the scale line, N denotes the total number of scale marks provided on the scale disc. M denotes the number of first sensor heads.

When five first sensor heads 12 are provided, the first sensor heads 12 are arranged with an angular interval of one-fifth of 360 degrees around a circle. When M angle detecting devices are provided, the first sensor heads 12 are arranged with an equal angular interval of one M-th in the same manner. This is called the equal-division-averaging method.

The angular error includes not only the angular error between the ideal position and the actual position of the scale line as shown in FIG. 1 but also, e.g., the angular error caused by the influence of axis eccentricity of the angle detecting device itself and the influence of change of the angle detecting device with the aging variation.

In particular, the angular error includes: synchronous angular errors that are synchronized with the rotation angle, such as an angular error caused by the scale and the axis eccentricity; and asynchronous angular errors that are not synchronized with the rotation angle, such as an angular error due to a bearing of a rotating shaft, and an angular error caused by axis run-out or the like dependent on measurement environments, e.g. the temperature and change with the aging variation.

The applicant (assignee) proposed an angle detecting device with a self-calibration function, in which, as shown in Patent Literature 2 below, when a self-calibration method by the equal-division-averaging method is utilized to make calibration, the angle detecting device can constantly make accurate calibration, by making it possible to obtain calibration values of a scale including, e.g. the influence of axis eccentricity of the angle detecting device itself and change of the angle detecting device with the aging variation, using an arithmetic device built-in the main body of the angle detecting device or an arithmetic device electrically connected thereto, in order to solve the error caused by the axis eccentricity occurred in the time period of connection of a rotating shaft with the angle detecting device in the calibration device, and in which the size of the angle detecting device can be reduced.

CITATION LIST

Patent Literatures

Patent Literature 1: Japanese Patent No. 2972652
Patent Literature 2: Japanese Patent No. 3826207

SUMMARY OF INVENTION

Technical Problem

According to an angle detecting device with a self-calibration function according to Patent Literature 2 above, it is possible to structure the angle detecting device with the self-calibration function that detects an angular error of a scale and can cope with a high-speed rotating shaft with a high degree of accuracy at a low cost, and moreover, its object is to provide an axis run-out measuring method for measuring an asynchronous angular error by giving attention to the fact that a synchronous angular error in synchronized with a rotation angle of the angular error and an asynchronous angular error not in synchronized therewith can be separated by arithmetic processing, and furthermore, its another object is to provide an angle detecting device with a self-calibration function having an axis run-out measuring function, in which the asynchronous angular error can be detected and an axis run-out measuring function is also provided, so that various kinds of setups to a spindle of a processing machine, an engine, a drive shaft of an automobile, and the like, can be made readily.

Solution to Problem

In order to solve the above problems, an axis run-out measuring method of the present invention is an axis run-out measuring method using an angle detecting device with a self-calibration function, in which a plurality of sensor heads is provided with an equiangular interval at a circumference of a scale disc fixed to a rotating shaft, and when one of the sensor heads is selected as a reference sensor head, a sum of measurement differences between the reference sensor head and the respective other sensor heads, and this sum is divided by the number of sensor heads, to determine an average value, whereby a self-calibration value is obtained, and the axis run-out measuring method includes: a procedure for changing a sensor head selected as the reference sensor head to another sensor head in order one by one, and obtaining each of the self-calibration values for all the sensor heads where each of all the sensor heads is adopted as the reference head; a procedure for deviating each of the self-calibration values by an angle in terms of arrangement on the scale disc with respect to a particular sensor head, and aligning a phase to a self-calibration value where the particular sensor head is adopted as the reference head; a procedure for determining an average value for the self-calibration values having been subjected to the phase conversion; and a procedure for subtracting the average value of the self-calibration values having been subjected to the phase conversion from each of the self-calibration values having been subjected to the phase conversion, thereby obtaining only asynchronous angular errors.

An angle detecting device with a self-calibration function having an axis run-out measuring function of the present invention has a structure, in which a plurality of sensor heads is provided with an equiangular interval at a circumference of a scale disc fixed to a rotating shaft, and when one of the sensor heads is selected as a reference sensor head, a sum of measurement differences between the reference sensor head and the other respective sensor heads, and this sum is divided by the number of sensor heads, to determine an average value, whereby a self-calibration value is obtained, and the angle detecting device with the self-calibration function having an axis run-out measuring function has: self-calibration value calculation means for changing a sensor head selected as the reference sensor head to another sensor head in order one by one, and obtaining each of the self-calibration values for all the sensor heads where each of all the sensor heads is adopted as the reference head; phase converting means for deviating each of the self-calibration values by an angle in terms of arrangement with respect to a particular sensor head, and aligning a phase to a self-calibration value where the particular sensor head is adopted as the reference head; average value calculation means for determining an average value for all the calculation results of the phase converting means; and dynamic error extracting means for subtracting the calculation result of the average value calculation means from each of the calculation results of the phase converting means, thereby obtaining only asynchronous angular errors.

Advantageous Effects of Invention

According to the present invention, since, with a calculation device (arithmetic device) built-in an angle detecting device with a self-calibration function or a calculation device connected via a wire with the angle detecting device, an angle detecting device itself is provided with a function for extracting an asynchronous angular error, for example, the angle detecting device provided in a crank shaft of an engine and a drive shaft of an automobile can be provided with a function for detecting run-out of a rotating shaft, and the functionality of the angle detecting device can be enhanced with a small size, light weight, and at a low cost.

BRIEF DESCRIPTION OF DRAWINGS

◯ shown in graphs in FIGS. 4 to 9 denotes a position where a j-th sensor head detects a scale number 1 (i=1) of a scale disc. △ denotes a position of a scale number of the scale disc that is detected when the j-th sensor head starts measurement.

Δ of FIG. 10 denotes a measurement start position, and an arrow denotes a direction of change of asynchronous angular error with respect to the rotation.

MODE FOR CARRYING OUT THE INVENTION

Examples

First, an angle detecting device with a self-calibration function serving as a basis of the present invention will be explained.

Figure 1:
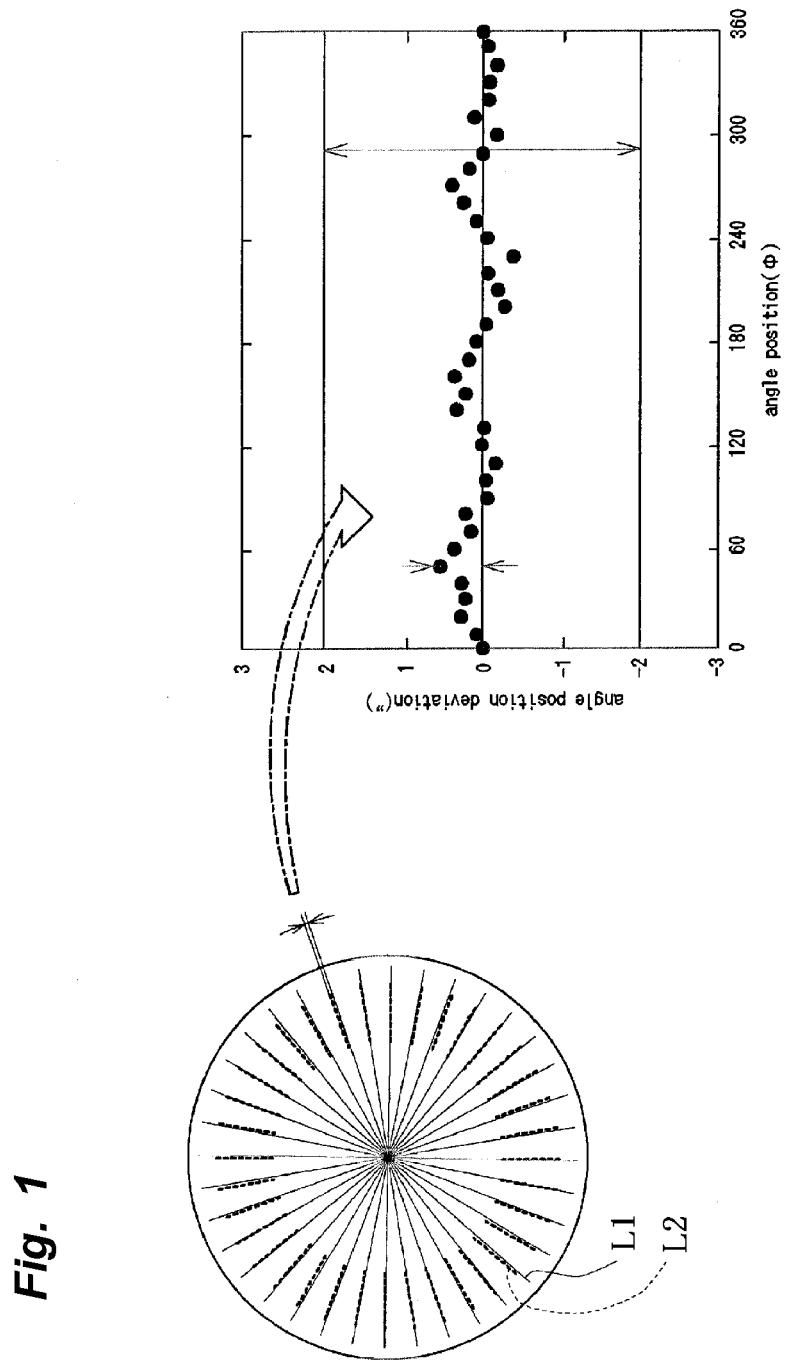
FIG. 1 is a figure illustrating a principle of a rotary encoder.
Figure 2:
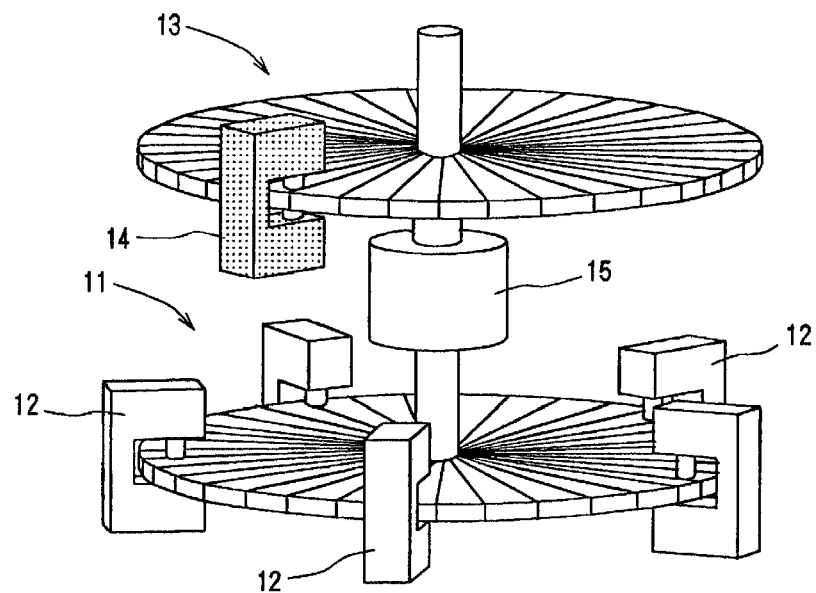
FIG. 2 is a figure illustrating an angle detecting device using the equal-division-averaging method.
Figure 3:
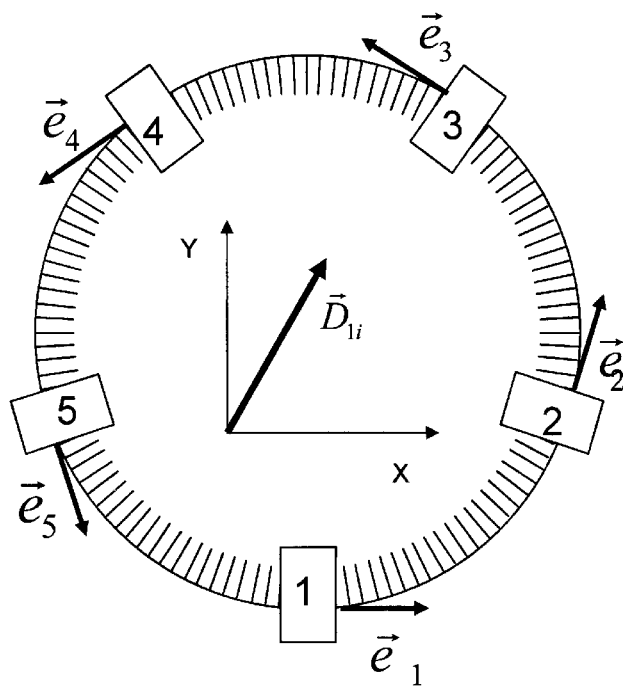
FIG. 3 is a figure illustrating an example in which five sensor heads are arranged on a scale disc with an identical interval.

In this example, as shown in FIG. 3, five sensor heads are arranged with an equiangular interval at a circumference of a scale disc connected to a rotating shaft, and based on a detected value obtained with this device, a calculation device built-in a main body of the detecting device or a calculation device electrically connected to the main body, conducts the following calculation processing, to detect an angle.

Herein, i denotes a scale number, N denotes the total number of scale marks on the scale disc, j denotes a sensor head number, and M denotes the total number of sensor heads. The measurement starts when the first sensor head (j=1) detects an origin point signal of a scale line, and a scale number i detected thereafter is set at 1 (1=1). An angular error $a_{1i,j}$ detected by the j-th sensor head after the start of the measurement, is constituted by a synchronous angular error Si in synchronized with the rotation angle and an asynchronous angular error $\vec{D}_{1i}$ not in synchronization therewith.

This is expressed as follows.

$$a_{1i,j} = S_{i+\frac{N}{M}(j-1)} + \left(\vec{D}_{1i} \cdot \vec{e}_j\right) \qquad (2)$$

Herein, a suffix 1i of $a_{1i,j}$ and $\vec{D}_{1i}$ denotes the scale number of the scale disc detected by the first sensor head, and $\vec{e}_j$ denotes a unit vector in a tangential direction with respect to the scale disc of each sensor head position.

In general, a difference δ of angular signals which are output from two of M sensor heads is represented as a difference of angular errors thereof. Specifically, when a sensor head compared with the j-th sensor head is the k-th sensor head, this is expressed by the following expression.

$$\delta_{1i,j,k} = a_{1i,j} - a_{1i,k} \qquad (3)$$
$$= S_{i+\frac{N}{M}(j-1)} - S_{i+\frac{N}{M}(k-1)} + \left[\left(\vec{D}_{1i} \cdot \vec{e}_j\right) - \left(\vec{D}_{1i} \cdot \vec{e}_k\right)\right]$$

When there are five sensor heads (M=5), the expression (3) is expanded into the following expression, in which the j-th sensor head is adopted as a reference sensor head.

$$M = 5 \qquad (4)$$

$$\delta_{1i,j,1} = a_{1i,j} - a_{1i,1} = S_{i+\frac{N}{5}j} - S_{i+\frac{N}{5}0} + \left[\left(\vec{D}_{1i} \cdot \vec{e}_j\right) - \left(\vec{D}_{1i} \cdot \vec{e}_1\right)\right]$$

$$\delta_{1i,j,2} = a_{1i,j} - a_{1i,2} = S_{i+\frac{N}{5}j} - S_{i+\frac{N}{5}1} + \left[\left(\vec{D}_{1i} \cdot \vec{e}_j\right) - \left(\vec{D}_{1i} \cdot \vec{e}_2\right)\right]$$

$$\delta_{1i,j,3} = a_{1i,j} - a_{1i,3} = S_{i+\frac{N}{5}j} - S_{i+\frac{N}{5}2} + \left[\left(\vec{D}_{1i} \cdot \vec{e}_j\right) - \left(\vec{D}_{1i} \cdot \vec{e}_3\right)\right]$$

$$\delta_{1i,j,4} = a_{1i,j} - a_{1i,4} = S_{i+\frac{N}{5}j} - S_{i+\frac{N}{5}3} + \left[\left(\vec{D}_{1i} \cdot \vec{e}_j\right) - \left(\vec{D}_{1i} \cdot \vec{e}_4\right)\right]$$

$$\delta_{1i,j,5} = a_{1i,j} - a_{1i,5} = S_{i+\frac{N}{5}j} - S_{i+\frac{N}{5}4} + \left[\left(\vec{D}_{1i} \cdot \vec{e}_j\right) - \left(\vec{D}_{1i} \cdot \vec{e}_5\right)\right]$$

In the expression (3), the j-th sensor head is adopted as the reference sensor head, and the differences δ of the angular signal from the respective sensor heads are obtained. Then, a value μ is obtained by calculating an average of the differences δ, as follows.

$$\mu_{1i,j} = \frac{1}{M} \sum_{k=1}^{M} \delta_{1i,j,k} \qquad (5)$$

$$= S_{i+\frac{N}{M}(j-1)} - \frac{1}{M} \sum_{k=1}^{M} S_{i+\frac{N}{M}(k-1)} +$$

$$\left[\left(\vec{D}_{1i} \cdot \vec{e}_j\right) - \frac{1}{M} \sum_{k=1}^{M} \left(\vec{D}_{1i} \cdot \vec{e}_k\right)\right]$$

$$= S_{i+\frac{N}{M}(j-1)} - \frac{1}{M} \sum_{k=1}^{M} S_{i+\frac{N}{M}(k-1)} + \left(\vec{D}_{1i} \cdot \vec{e}_j\right)$$

$$= a_{1i,j} - \frac{1}{M} \sum_{k=1}^{M} S_{i+\frac{N}{M}(k-1)}$$

$$\because \frac{1}{M} \sum_{k=1}^{M} \left(\vec{D}_{1i} \cdot \vec{e}_k\right) = 0$$

It should be noted that $\vec{e}_j$ is a unit vector in a tangential direction with respect to the scale disc of each sensor head position.

Figure 4:
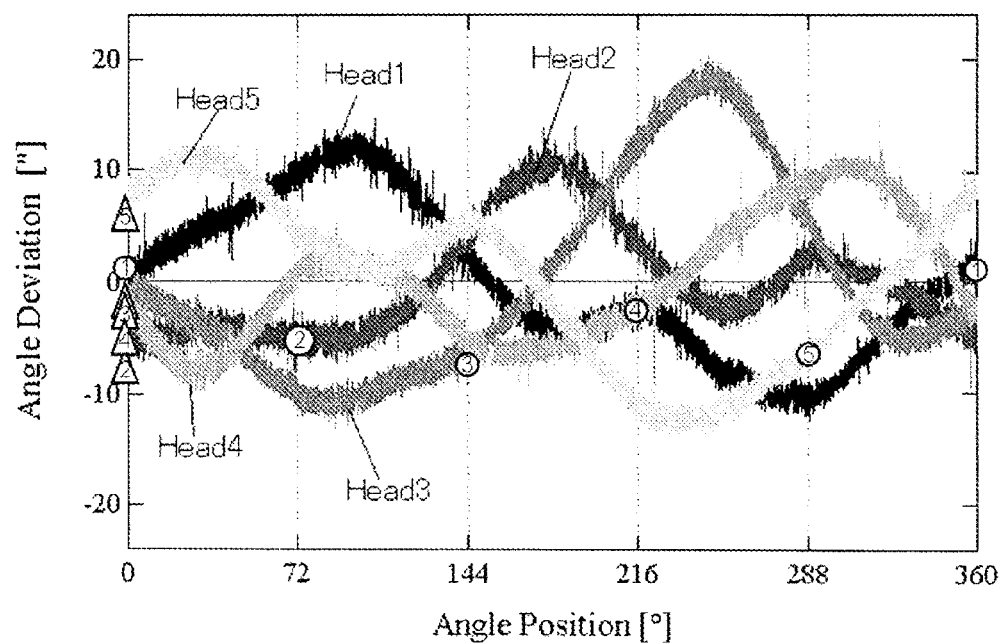
FIG. 4 is a graph showing a result obtained by calculating a calibration value of each sensor head in an angle detecting device with a self-calibration function serving as a basis.

As described above, the self-calibration value of $a_{1i,j}$ as shown in the expression (1) can be obtained, by obtaining measurement differences between the first reference sensor head and the first to the fifth respective sensor heads and determining an average value μ. However, the second term at the right hand side, $$-\frac{1}{M} \sum_{k=1}^{M} S_{i+\frac{N}{M}(k-1)},$$

is a value that has only a frequency component of $a_{1i,j}$ of a power of a multiple of M, when performing frequency component analysis of $a_{1i,j}$. FIG. 4 shows a calculation result of a self-calibration value obtained when the number j of the reference sensor head is changed from 1 to 5 in the case where there are five sensor heads (M=5).

As described above, a plurality of sensor heads are arranged with an equiangular interval at the circumference of the scale disc fixed to the rotating shaft, and one of the plurality of sensor heads is selected as a reference sensor head. A sum of measurement differences between the reference sensor head and the other respective sensor head is obtained. Then, this sum is divided by 5, i.e. the number of sensor heads, to determine the average value, whereby the self-calibration value can be obtained.

Now, in the expression (5), when the number j of the reference sensor head is changed from 1 to M, the self-calibration value indicated by the respective $\mu_{1i,j}$ has simultaneousness with the same i, but is deviated, as the calibration value of the scale, by the deviation of the arrangement position of the respective sensor head, i.e. deviated by the angular phase $$\varphi = \frac{N}{M}(k-1)$$

of the scale.

Accordingly, conversion is made so that the angular phase of the scale becomes identical, although this simultaneousness is lost.

This converted value $\mu_{1i,j}(\varphi \triangleleft t)$ is expressed by the expression (6).

$$\mu_{1i,j}(\varphi \triangleleft t) = \mu_{1i-\frac{N}{M}(j-1),j} \qquad (6)$$

$$= \frac{1}{M}\sum_{k=1}^{M} \delta_{1i-\frac{N}{M}(j-1),j,k}$$

$$= S_{i-\frac{N}{M}(j-1)+\frac{N}{M}(j-1)} - \frac{1}{M}\sum_{k=1}^{M} S_{i-\frac{N}{M}(j-1)+\frac{N}{M}(k-1)} + \left(\vec{D}_{1i-\frac{N}{M}(j-1)} \cdot \vec{e}_j\right)$$

$$= S_i - \frac{1}{M}\sum_{k=1}^{M} S_{i+\frac{N}{M}(k-1)} + \left(\vec{D}_{1i-\frac{N}{M}(j-1)} \cdot \vec{e}_j\right)$$

Figure 5:
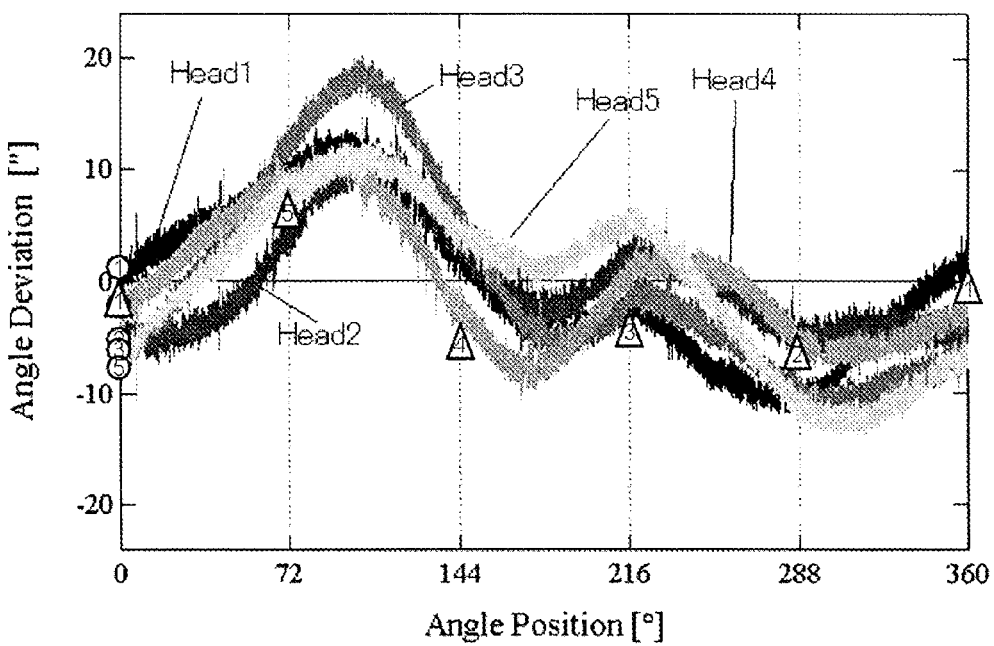
FIG. 5 is a graph illustrating data obtained by aligning the phases of the calculation result of FIG. 4.

The average value after the angular phase has been thus converted, is shown in FIG. 5.

Herein, $$\sum_{k=1}^{M} S_{i-\frac{N}{M}(j-1)+\frac{N}{M}(k-1)}$$

and $$\frac{1}{M}\sum_{k=1}^{M} S_{i+\frac{N}{M}(k-1)}$$

represent equivalent results, because they have averages of M pieces of data obtained by deviating the phase of $S_i$ by $$\frac{1}{M}.$$

Thus, this average $\bar{\mu}_i(\varphi \triangleleft t)$ is expressed as follows.

$$\bar{\mu}_i(\varphi \triangleleft t) = \frac{1}{M}\sum_{j=1}^{M} \mu_{i,j}(\varphi \triangleleft t) \qquad (7)$$

$$= S_i - \frac{1}{M}\sum_{k=1}^{M} S_{i+\frac{N}{M}(k-1)} + \frac{1}{M}\sum_{j=1}^{M}\left(\vec{D}_{1i-\frac{N}{M}(j-1)} \cdot \vec{e}_j\right)$$

Figure 6:
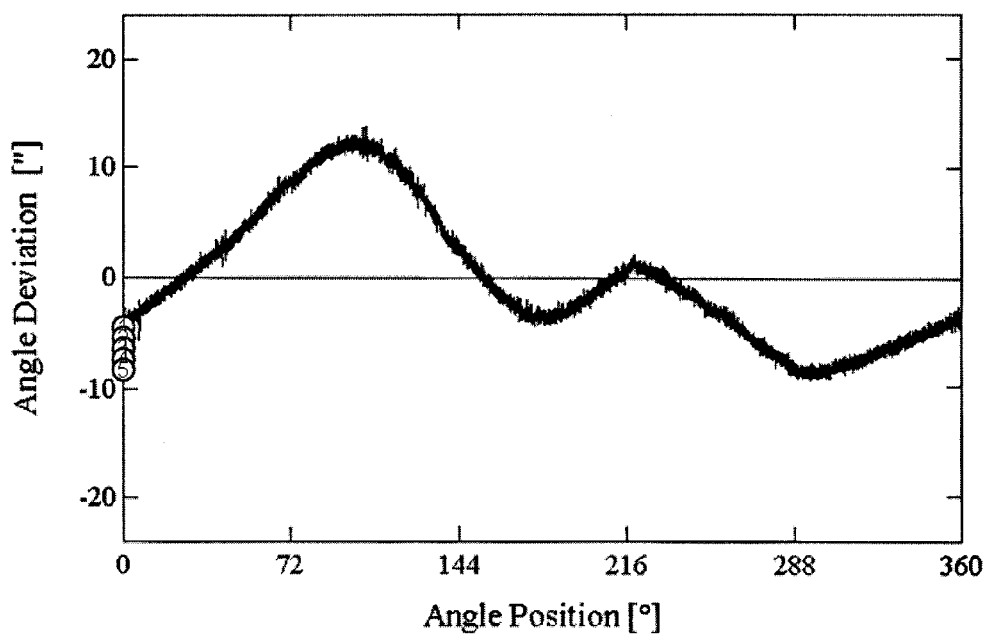
FIG. 6 is a graph illustrating average values of the data of FIG. 5.

The value of this average $\bar{\mu}_i(\varphi \triangleleft t)$ is shown in FIG. 6.

The synchronous angular error $S_i$ is deleted, by subtracting this average value $\bar{\mu}_i(\varphi \triangleleft t)$ from $\mu_{1i,j}(\varphi \triangleleft t)$, to represent as an expression including only the asynchronous angular error $\vec{D}_{1i}$, as follows.

$$D_{i,j}(\varphi \triangleleft t) = \mu_{i,j}(\varphi \triangleleft t) - \bar{\mu}_i(\varphi \triangleleft t) \qquad (8)$$

$$= \left[S_i - \frac{1}{M}\sum_{k=1}^{M} S_{i+\frac{N}{M}(k-1)} + \left(\vec{D}_{1i-\frac{N}{M}(j-1)} \cdot \vec{e}_j\right)\right] -$$

$$\left[S_i - \frac{1}{M}\sum_{k=1}^{M} S_{i+\frac{N}{M}(k-1)} + \frac{1}{M}\sum_{j=1}^{M}\left(\vec{D}_{1i-\frac{N}{M}(j-1)} \cdot \vec{e}_j\right)\right]$$

$$= \left(\vec{D}_{1i-\frac{N}{M}(j-1)} \cdot \vec{e}_j\right) - \frac{1}{M}\sum_{j=1}^{M}\left(\vec{D}_{1i-\frac{N}{M}(j-1)} \cdot \vec{e}_j\right)$$

$$= \left(\vec{D}_{1i-\frac{N}{M}(j-1)} \cdot \vec{e}_j\right) - d_i$$

In the expression, $d_i$ is expressed as $$d_i = \frac{1}{M}\sum_{j=1}^{M}\left(\vec{D}_{1i-\frac{N}{M}(j-1)} \cdot \vec{e}_j\right).$$

Figure 7:
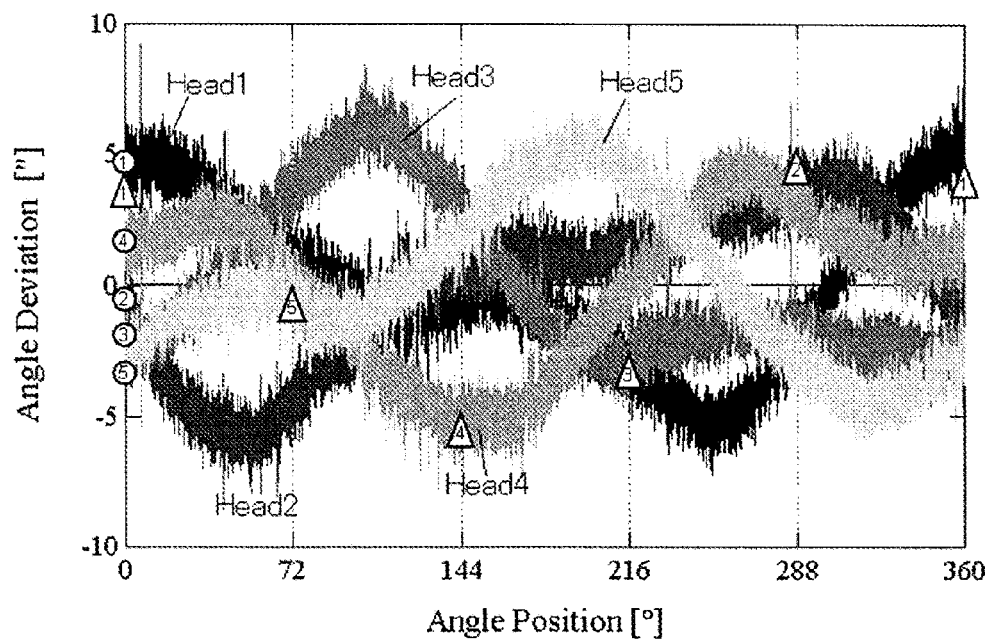
FIG. 7 is a graph illustrating calculated asynchronous angular errors.

This calculation result is shown in FIG. 7.

In the expression (8), the phase of the angular scale is muching, but the time period is not muching. Accordingly, the asynchronous angular error at the same time point can be extracted, by changing the angular phase backward by the angular phase $$\varphi = \frac{N}{M}(k-1).$$

The expression (9) shows a value $D_{i,j}(\varphi \triangleright t)$, in which the simultaneousness of the time is recovered, by shifting the phase of the angle in the same manner as the measurement.

$$D_{i,j}(\varphi \triangleright t) = (\mu_{i,j}(\varphi \triangleleft t) - \bar{\mu}_i(\varphi \triangleleft t))_{\varphi \triangleright t} \qquad (9)$$

$$= \left(\vec{D}_{1i-\frac{N}{M}(j-1)+\frac{N}{M}(j-1)} \cdot \vec{e}_j\right) - d_{i+\frac{N}{M}(j-1),j}$$

$$= \left(\vec{D}_{1i} \cdot \vec{e}_j\right) - d_{i+\frac{N}{M}(j-1),j}$$

The value $$d_{i+\frac{N}{M}(j-1),j}$$

at the second term at the right hand side of the expression (9) denotes an average value of $(\vec{D}_{1i} \bullet \vec{e}_j)$ detected at different sensor head positions at different time points, and is close to a value having a frequency component of a component of a power of a multiple of M obtained when the frequency component analysis of $(\vec{D}_{1i} \bullet \vec{e}_j)$ is performed. Thus, the value $$d_{i+\frac{N}{M}(j-1),j}$$

at the second term at the right hand side of the expression (9) is sufficiently smaller than $(\vec{D}_{1i} \bullet \vec{e}_j)$ in general. Under this situation, the expression (9) may be deemed as $(\vec{D}_{1i} \bullet \vec{e}_j)$ as shown in the expression (10), as follows.

$$D_{i,j}(\phi \triangleright t) \approx (\vec{D}_{1i} \cdot \vec{e}_j) \quad (10)$$

Figure 8:
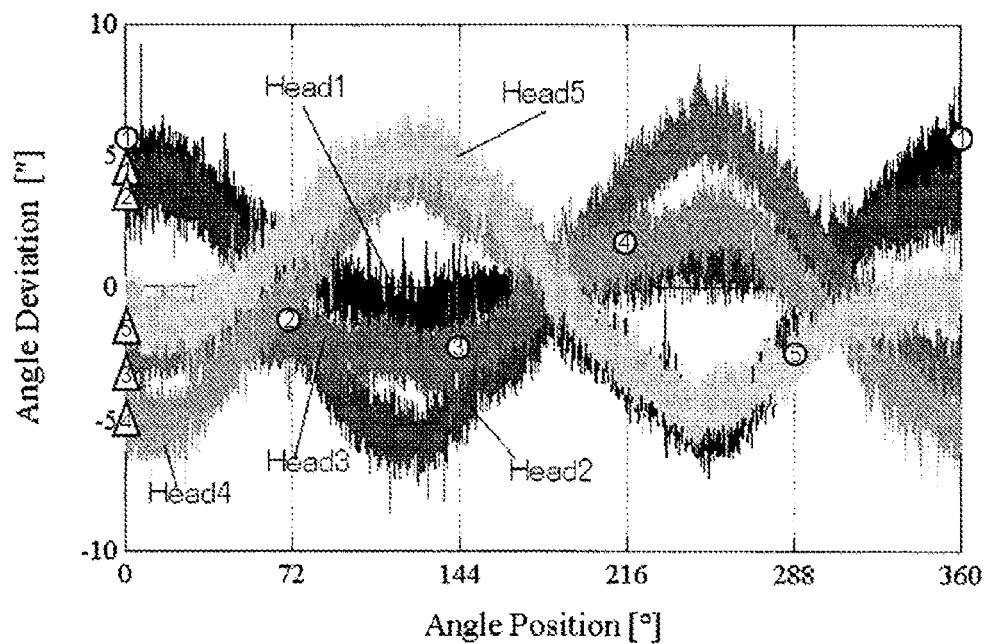
FIG. 8 is a graph illustrating a result obtained by integrating time periods of the asynchronous angular errors.

FIG. 8 shows an example of a result $D_{i,j}(\phi \triangleright t)$ obtained by making the time periods of the asynchronous angular error $\vec{D}_{1i}$ the same.

$D_{i,j}(\phi \triangleright t)$ as shown in FIG. 8 is an intensity when the asynchronous angular error $\vec{D}_{1i}$ as shown in FIG. 3 is projected in a tangential direction of a circle at the respective sensor head position. Thus, when an XY coordinate is defined in a manner of rotation plane, calculation is made of the intensities of this value in the X, Y directions when the asynchronous angular error $\vec{D}_{1i}$ is projected, to give the values as shown in FIG. 9.

Figure 9:
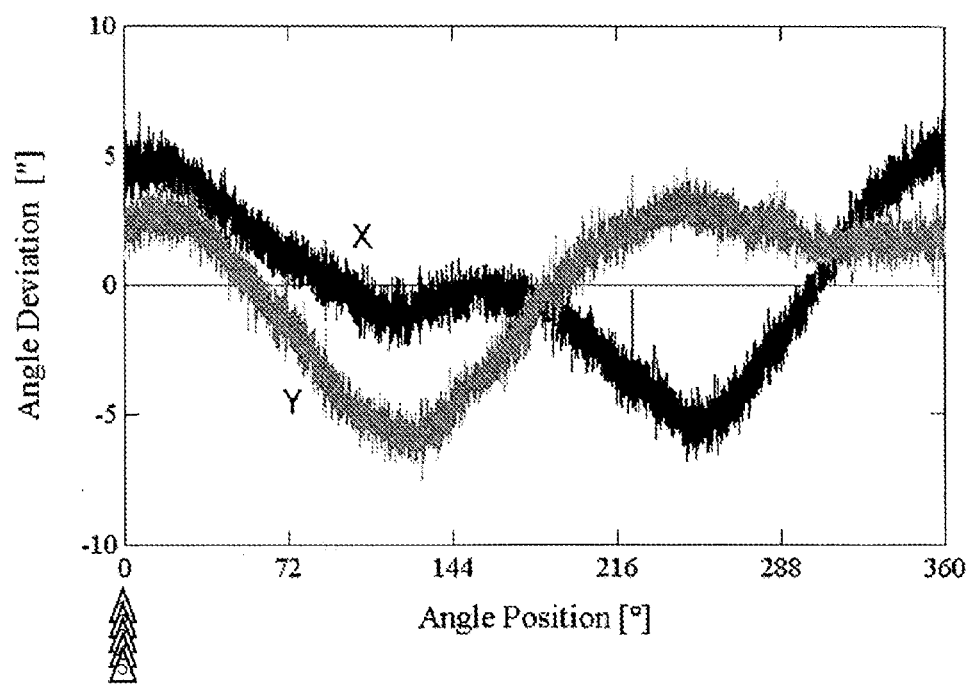
FIG. 9 is a graph illustrating a state when the asynchronous angular errors are projected onto an XY coordinate defined on a rotation plane.
Figure 10:
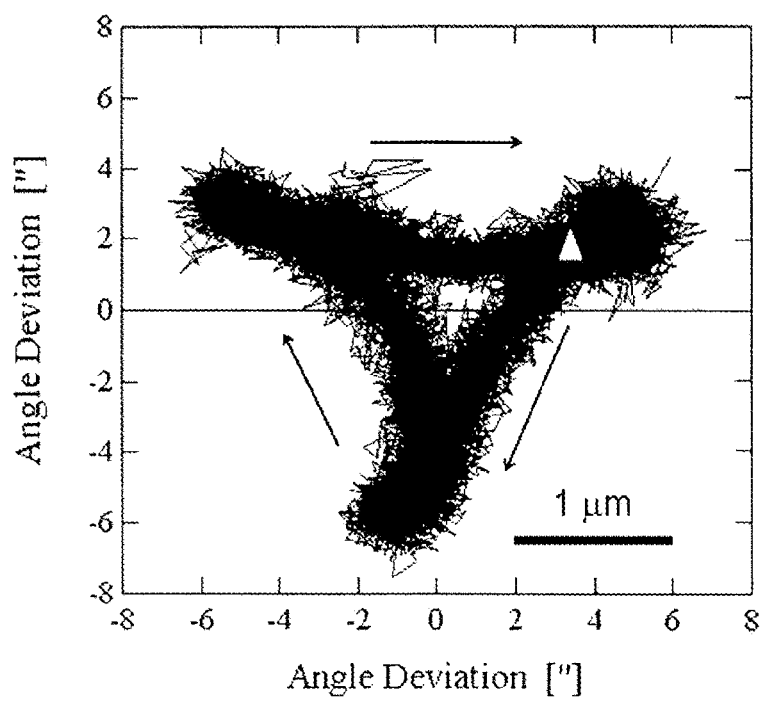
FIG. 10 is a graph illustrating the asynchronous angular errors on the XY coordinate defined on the rotation plane.

When the intensities in the X axis and the Y axis as shown in FIG. 9 are represented as the asynchronous angular error $\vec{D}_{1i}$ in the XY coordinate, the intensities are represented as shown in FIG. 10.

When this value is projected onto the XY coordinate if necessary, the asynchronous angular error factor of the rotation can be evaluated in a quantitative manner.

That is, in this example, a scale disc with a total number of scale marks N=16,384 with interval 20 µm is used for the rotary encoder. The interval 20 µm corresponds to 360 degrees/16,384 scale marks=about 79 seconds (angle).

Thus, the asynchronous angular error of FIG. 9, which is about 4 seconds (angle), corresponds to about 1 µm by the following conversion formula.

$$20 \,\mu m \times \frac{4''}{79''} \approx 1 \,\mu m \quad (11)$$

A factor that caused deviation of about 1 µm obtained from this asynchronous angular error, is expected to be axis run-out caused by deviation due to a gap between an inner ring and an outer ring of a bearing and/or unevenness of a ball shape of the ball bearing.

When the calculation processing explained above is processed by the calculation device built-in the main body of the detecting device or the calculation device electrically connected thereto, the angle detecting device with the self-calibration function having the axis run-out measuring function capable of accurately measuring the axis run-out can be achieved, by only adding a program without modifying the main body of the detecting device in terms of its structure.

INDUSTRIAL APPLICABILITY

As described above, according to the present invention, the angle detecting device as described above can achieve the function of extracting the asynchronous angular error, by simply adding program software to the calculation device built-in the angle detecting device with the self-calibration function or the calculation device connected via a wire with the angle detecting device. Thus, run-out of the rotating shaft, such as a spindle of a processing machine, a crank shaft of an engine, and a drive shaft of an automobile, can be detected, at a low cost with a small size. Therefore, the present invention can be widely applied as a safety device, an abnormality detection device, or the like.

REFERENCE SIGNS LIST

11 First angle detecting device
12 First sensor head provided in the first angle detecting device
13 Second angle detecting device
14 Second sensor head provided in the second angle detecting device

The invention claimed is:

1. An axis run-out measuring method using an angle detecting device with a self-calibration function, in which a plurality of sensor heads is provided with an equiangular interval at a circumference of a scale disc fixed to a rotating shaft, and when one of the sensor heads is selected as a reference sensor head, a sum of measurement differences between the reference sensor head and the other respective sensor heads is calculated, and this sum is divided by the number of sensor heads, to determine an average value, whereby a self-calibration value is obtained, with the axis run-out measuring method comprising the steps of:

changing a sensor head selected as the reference sensor head to another sensor head in order one by one, and obtaining each of the self-calibration values for all the sensor heads where each of all the sensor heads is adopted as the reference head;

deviating each of the self-calibration values by an angle in terms of arrangement on the scale disc with respect to a particular sensor head, and aligning a phase to a self-calibration value where the particular sensor head is adopted as the reference head, to conduct phase conversion;

determining an average value for the self-calibration values having been subjected to the phase conversion; and subtracting the average value of the self-calibration values having been subjected to the phase conversion from each of the self-calibration values having been subjected to the phase conversion, thereby obtaining only asynchronous angular errors.

2. An angle detecting device with a self-calibration function having an axis run-out measuring function, in which a plurality of sensor heads is provided with an equiangular interval at a circumference of a scale disc fixed to a rotating shaft, and when one of the sensor heads is selected as a reference sensor head, a sum of measurement differences between the reference sensor head and the other respective sensor heads is calculated, and this sum is divided by the number of sensor heads, to determine an average value, whereby a self-calibration value is obtained, with the angle detecting device with the self-calibration function having an axis run-out measuring function comprising:
- self-calibration value calculator for changing a sensor head selected as the reference sensor head to another sensor head in order one by one, and obtaining each of the self-calibration values for all the sensor heads where each of all the sensor heads is adopted as the reference head;
- phase converter for deviating each of the self-calibration values by an angle in terms of arrangement with respect to a particular sensor head, and aligning a phase to a self-calibration value where the particular sensor head is adopted as the reference head;
- average value calculator for determining an average value for all the calculation results of the phase converter; and
- dynamic error extractor for subtracting the calculation result of the average value calculator from each of the calculation results of the phase converter, thereby obtaining only asynchronous angular errors.

* * * * *